United States Patent
Gill et al.

(12) 
(10) Patent No.: US 6,650,495 B2
(45) Date of Patent: *Nov. 18, 2003

(54) RECORDING ERROR HISTORY EMBEDDED REWRITEABLE MEDIA

(75) Inventors: Richard A. Gill, Arvada, CO (US); Benjamin J. Baron, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/174,551

(22) Filed: Jun. 18, 2002

(65) Prior Publication Data

US 2002/0154433 A1 Oct. 24, 2002

Related U.S. Application Data

(63) Continuation of application No. 09/452,619, filed on Dec. 1, 1999.

(51) Int. Cl.[7] .................. G11B 20/18; G06F 11/34; G06F 11/26
(52) U.S. Cl. ............................ 360/53; 360/31
(58) Field of Search ................ 360/53, 31, 71, 360/25, 48

(56) References Cited

U.S. PATENT DOCUMENTS

| | | | |
|---|---|---|---|
| 4,549,295 A | 10/1985 | Purvis | |
| 5,633,767 A | 5/1997 | Boutaghou et al. | |
| 5,721,816 A | 2/1998 | Kusbel et al. | |
| 5,859,737 A | * 1/1999 | Okihara et al. | 360/48 |
| 6,084,733 A | 7/2000 | Ohzeki et al. | |
| 6,469,854 B1 | * 10/2002 | Gill et al. | 360/53 |

FOREIGN PATENT DOCUMENTS

| | | |
|---|---|---|
| EP | 0 889 474 | 1/1999 |
| JP | 10 134528 | 5/1998 |
| WO | 93 10494 | 5/1993 |

OTHER PUBLICATIONS

"Detection and Reallocation of Defective Clusters in Removable DASD Media"; IBM Technical Disclosure Bulletin, IBM Corp., New York, US, vol. 37, No. 6B, Jun. 1, 1994, pp. 571–572, XP000456101, ISSN: 018–8689.

"Distinguishing Between Media Flaws and Contamination in Optical Drives", IBM Technical Disclosure Bulletin, US, IBM Corp. New York, vol. 38, No. 5, May 1, 1995, pp. 371–376, XP000519614, ISSN: 0018–8689.

"Dynamic Arrangement of Error Recovery Procedure Table Sequence", IBM Technical Disclosure Bulletin, US, IBM Corp. New York, vol. 39, No. 6, Jun. 1, 1996, pp. 41–42, XP000678516, ISSN: 0018–8689.

Anonymous: "Shortcut Error Recovery Procedure", Research Disclosure, No. 428, Dec. 1, 1999, p. 1703, XP002168381, Havant, UK, article No. 428139.

Anonymous: "Hardware and Volume Statistical Analysis and Reporting System for Detecting and Isolating Media and Hardware Errors on the Magstar Family of Tape Drives", Research Disclosure, No. 428, Dec. 1, 1999, p. 1729, XP002168380, Havant, UK, article No. 428182.

* cited by examiner

*Primary Examiner*—David Hudspeth
*Assistant Examiner*—Varsha A. Kapadia
(74) *Attorney, Agent, or Firm*—Wayne P. Bailey

(57) ABSTRACT

A system for recording the history associated with writing data onto rewriteable media includes an access head for writing data onto the media and reading data from the media. A drive motor moves the media past the access head. A write formatter formats data into a device block to be written onto the media. A read formatter detects errors in data read from the media. A control unit determines an error recovery procedure based on an error detected in reading the media and enables the write formatter to insert an indication of the error recovery procedure into the device block. The error recovery procedure is then attempted. The process is repeated until either a successful write occurs or the media is determined to be bad.

6 Claims, 3 Drawing Sheets

RECORDING ERROR HISTORY EMBEDDED REWRITEABLE MEDIA

This is a continuation of copending application(s) Ser. No. 09/452,619 filed on Dec. 1, 1999.

TECHNICAL FIELD

The present invention relates to recording information about errors occurring while writing to a rewriteable media.

BACKGROUND ART

Data is written onto rewriteable media for storage and subsequent retrieval. Typically, the data is contained in one or more blocks. If an error occurs during a block write operation, another attempt is made using an error recovery procedure. Repeated attempts may be made using different error recovery procedures until a write is successful or the media is determined to be bad.

An exemplary rewriteable media is magnetic tape. A typical magnetic tape access system includes a tape head with a write module and a read module trailing the write module in the direction of tape travel. The write module contains a plurality of write elements for simultaneously writing many data tracks. Similarly, the trailing read module contains a plurality of read elements for simultaneously reading the data tracks. Following each write element with a read element permits immediate read after write to verify that the data has been correctly written onto the tape. Write circuitry converts data into write module write signals. Read circuitry converts read module read signals into data. A drive controller controls one or more motors for moving the tape past the tape head in a particular direction and at a particular speed. A head position servo positions the head across the width of the tape to permit write and real elements access to appropriate data tracks. Head position relative to the tape is determined by reading servo tracks on the tape with servo read elements on the head.

If, during a write operation, data read by the trailing read head does not match the data just written by the write head, a write error has occurred. Write errors result from many causes including incorrect positioning of the tape head relative to the tape, incorrect tape velocity, debris on the tape, tape defects, and the like. Typically, when a write error is detected, the tape is rewound and one or more attempts to rewrite the data are performed. The tape system may sequence through a fixed set of error recovery procedures, each procedure including a rewrite attempt. If all rewrite procedures in the set fail, the tape is generally considered defective. At this point, an attempt may be made to recover any data that may be on the tape. The tape may then be analyzed to determine what problem caused the tape failure and to determine whether the problem was in the tape, the tape system, or both.

One difficulty encountered in analyzing a defective tape is in determining what types of problems were encountered with the tape prior to failure. Another difficulty is in establishing the error recovery procedure to minimize rewrite attempts. What is needed is to record the rewriteable media write history for later analysis, particularly after media failure. The analysis should be usable for establishing error recovery procedure determination.

DISCLOSURE OF INVENTION

It is an object of the present invention to record write error recovery procedure history.

It is another object of the present invention to record information regarding the type of error causing a rewrite.

It is still another object of the present invention to optimize determining an error recovery procedure using an acquired history of rewrite attempts.

It is yet another object of the present invention to record the number and types of rewrite attempts without significantly modifying the rewriteable media or the rewriteable media access system.

In carrying out the above objects and other objects and features of the present invention, a system for recording the history associated with writing data onto rewriteable media is provided. The system includes an access head for writing data onto the media and reading data from the media. A drive motor moves the media past the access head. A write formatter formats data into a device block to be written onto the media. A read formatter detects errors in data read from the media. A control unit determines an error recovery procedure based on an error detected in reading the media and enables the write formatter to insert an indication of the error recovery procedure into the device block. The error recovery procedure is then attempted. The process is repeated until either a successful write occurs or the media is determined to be bad.

In an embodiment of the present invention, the control unit determines an error type which is inserted into the device block by the write formatter. In a refinement, the write formatter inserts indications of the first error type and the most recently found error type into the device block.

In another embodiment of the present invention, the indication of the determined error recovery procedure is inserted into either or both of a header preceding the data and a trailer following the data.

In still another embodiment of the present invention, the error recovery procedure is determined based on a number of attempts to write the device block.

In yet another embodiment of the present invention, the error recovery procedure is determined based on a type of error detected.

A method of recording the history associated with writing data onto rewriteable media is also provided. A device block comprising the data is formed. At least a portion of the device block is written. A portion of the device block is read. If an error occurs in writing the device block, an error recovery procedure is determined. An indication of the determined error recovery procedure is inserted into the device block and the process repeated.

Rewriteable media having device blocks in at least one data track is also provided. Each device block includes an indication of the number of attempts required to write the device block.

A method of determining the history associated with rewriteable media write errors is also provided. After writing a plurality of device blocks including an indication of the error recovery procedure used to write the block, each device block is read to extract the inserted error recovery procedure indication. Error recovery procedure determination may be modified based on the extracted error recovery procedure indications.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
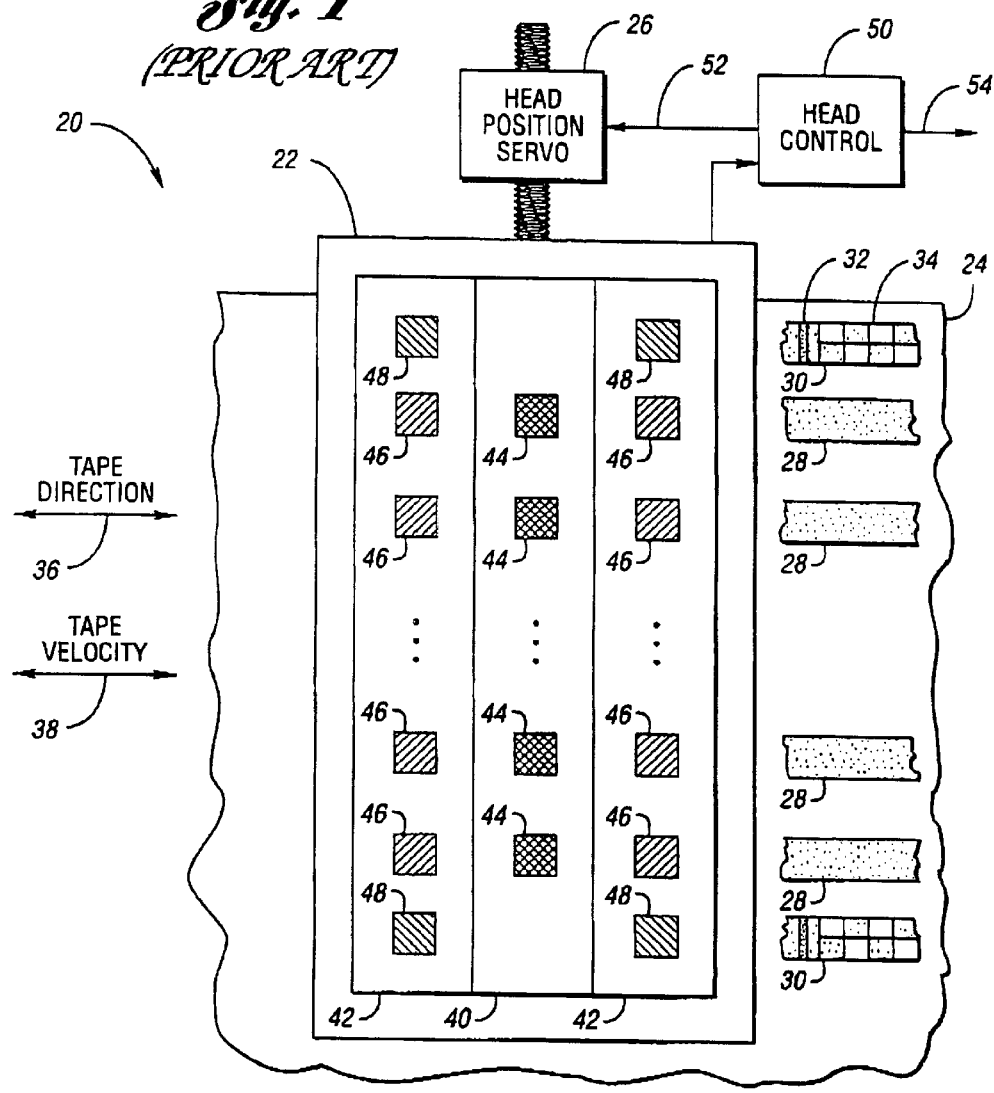
FIG. 1 is a schematic diagram of a magnetic tape and tape head system that may be used with the present invention.

Referring now to FIG. 1, a schematic diagram of a magnetic tape and tape head system that may be used with the present invention is shown. A tape head system, shown generally by 20, includes tape head 22 for accessing magnetic tape 24. Tape head 22 is positioned relative to tape 24 by head position servo 26. Tape 24 includes a plurality of data tracks 28 spaced across the width of tape 24. Tape 24 also includes at least one servo track 30 written along the length of tape 24. Each servo track 30 may include periodically spaced features such as synchronization field 32 and tracking pattern 34. Tape 24 travels across tape head 22 in either tape direction 36 with tape velocity 38. Only a portion of each data track 28 and servo track 30 are shown and only an outline for a portion of tape 24 is provided to permit the details of tape head 22 to be seen.

Tape head 22 in FIG. 1 includes one write module 40 between two read modules 42 to form a read-write-read head. Write module 40 includes a plurality of write elements 44. Write elements 44 are magnetic circuits which induce field patterns in data tracks 28 as tape 24 moves past a gap in write element 44. Read module 42 is manufactured to have a plurality of read elements 46. Read module 42 also includes at least one servo read element 48 aligned with read element axis 48. Read elements 46 and servo read elements 48 sense field patterns written onto data tracks 28 and servo strips 30 respectively by detecting changes in inductance or magnetoresistance induced by the field patterns. It will be recognized by one of ordinary skill in the art that the present invention does not depend on the design and construction of write elements 44, read elements 46, servo read elements 48, or head 22.

Servo read element 48 is positioned to read tracking pattern 34 on servo track 30. During tracking problems, data track 28 drifts away from the centers of elements 42, 46. This may result in overwriting adjacent tracks during a write operation. Head control 50 in communication with each servo read element 48 detects tracking pattern 34 and determines the offset of tape 24 relative to tape head 22 in the direction normal to tape direction 36. If head control 50 detects that servo track 30 is not centered on servo read element 48, head control 50 generates positioning signal 52 causing head position servo 26 to move tape head 22 relative to tape 24 until servo track 30 is centered across servo read element 48. If proper head alignment cannot be achieved, head control 50 generates head position error signal 54.

Figure 2:
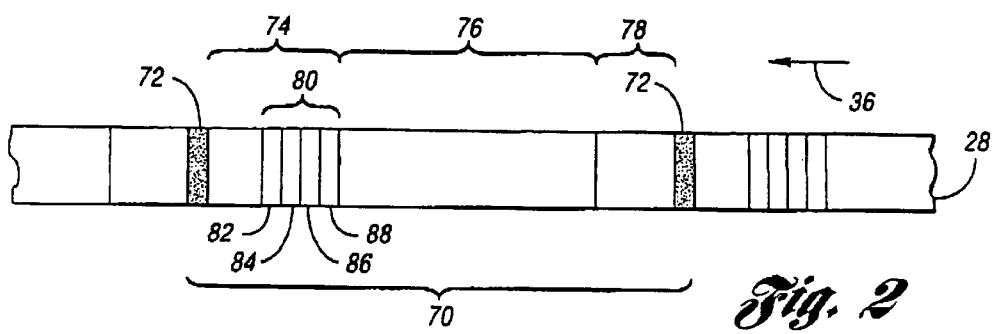
FIG. 2 is a schematic diagram of a data track with a device block according to an embodiment of the present invention.

Referring now to FIG. 2, a schematic diagram of a data track with a device block according to an embodiment of the present invention is shown. Data track 28 includes many device blocks, one of which is shown by 70, separated by gaps 72. Device block 70 typically includes leading administrative data or header 74, customer or padded data 76, and trailing administrative data or trailer 78. Header 74 may include various data fields as described in prior art such as, for example, a device block count indicating the position of device block 70 in the sequence of device blocks 70 written onto data track 28. Trailer 78 may contain similar information as header 74 to permit data track 28 to be read in either tape direction 36.

Header 74 includes error history information 80 having one or more indications of the write history, for device block 70. Error history information 80 may include retry count 82 indicating the number of attempts required to write device block 70. Retry count 82 may also indicate the last attempted error recovery procedure in writing device block 70. Error history information 80 may include one or more write error causes 84, each indicating the general reason for the write error necessitating the attempted rewrite of device block 70. Write errors may result from head tracking and alignment difficulties, tape velocity deviations, tape media defects, debris on tape head 22, or the like. Various options include recording each write error 84, recording the first write error 84 necessitating rewrite, recording the most recent write error 84, or any combination. Error history information 80 may include one or more error symptom codes 86, each indicating a specific error. Specific errors include servo track 30 not aligned with servo read element 48, cyclic redundancy code (CRC) check failure on read-after-write, block error correction code (ECC) failure on read-after-write, instantaneous velocity error of tape 24 past head 22, error in average tape velocity 38, tape 24 not positioned correctly for an append operation, and the like. Various options include recording each symptom code 86, recording the first symptom code 86 necessitating rewrite, recording the most recent symptom code 86, or any combination. Error history information 80 may include hardware specific information 88 such as an identification of the writing device, the number of data tracks 28 in error, the number of matrices within device block 70 detected in error, and the like.

Figure 3:
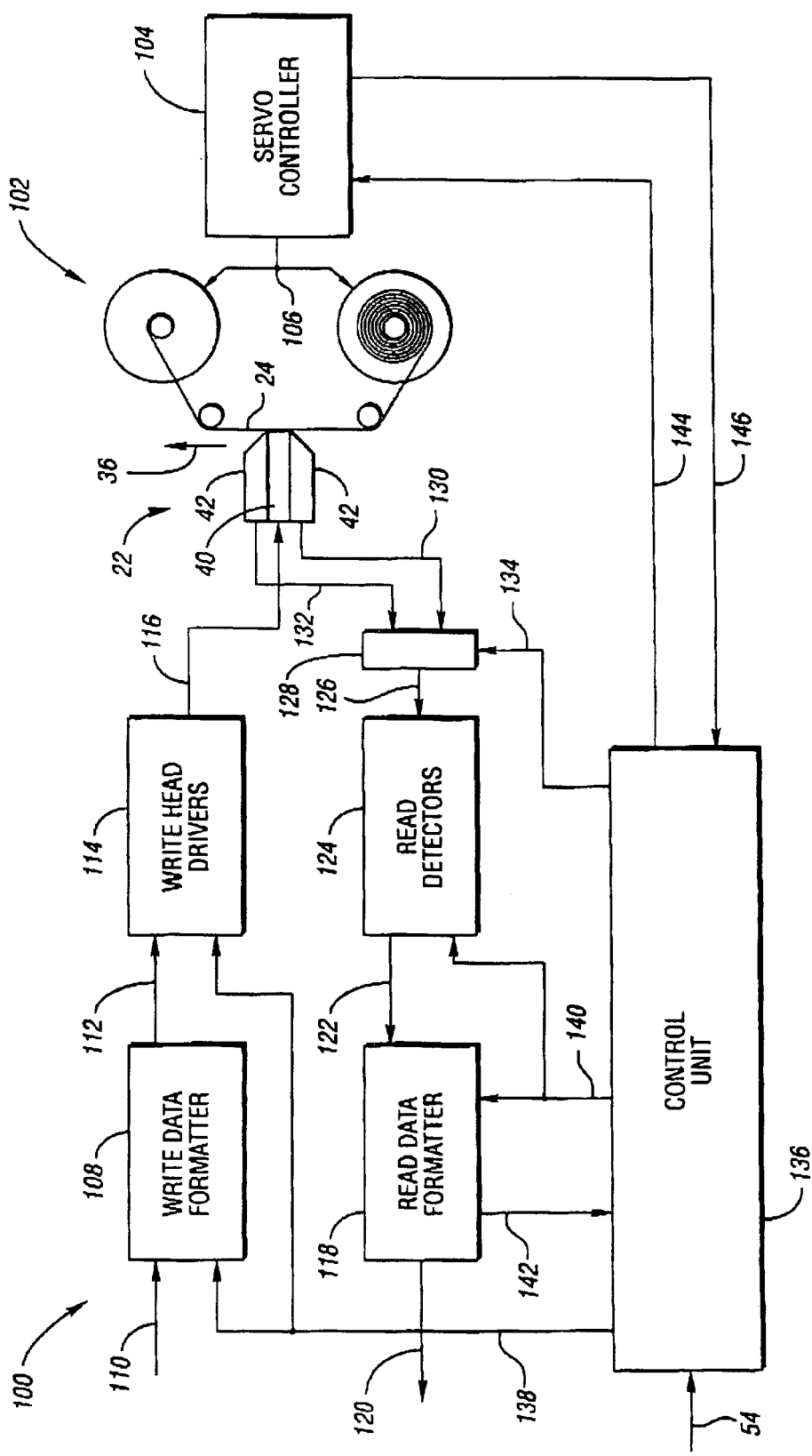
FIG. 3 is a block diagram of a system for recording write error history according to an embodiment of the present invention.

Referring now to FIG. 3, a block diagram of a system for recording write error history according to an embodiment of the present invention is shown. Tape system 100 includes a tape drive, shown generally by 102, for moving tape 24 past head 22 in tape direction 36. Servo controller 104 generates servo signals 106 for tape drive 102 to set the speed and direction of tape 24. Write data formatter 108 accepts input data 110 and generates formatted data 112 including one or more device blocks 70. Data formatting may include partitioning data for simultaneous storage on data tracks 28, introducing error detection and correction information, encoding, and the like. Write head drivers 114 accept formatted data 112 and generate write signals 116 for each write element 44 in write module 40. Read data formatter 118 generates output data 120 from read data 122 by performing the reverse operations of write data formatter 108. Read detectors 124 include preamplifiers and pulse detectors for generating read data 122 from read signals 126. Selector 128 outputs as read signals 126 either leading read signals 130 from read elements 46 in leading read module 42 or trailing read signals 132 from read elements 46 in trailing read module 42 based on select control signal 134, permitting read-after-write in either tape direction 36.

Control unit 136 sets select control signal 134. Control unit 136 also generates write enable 138 and read enable 140 controlling write circuitry 108,114 and read circuitry 118, 124, respectively. Control unit 136 accepts status signal 142 from read data formatter 118 indicating, among other parameters, read-after-write errors including CRC and ECC faults. Control unit 136 generates servo control signal 144 to servo controller 122 and receives servo status signals 146 from servo controller 122 indicating tape position and tape velocity errors. Control unit 136 also accepts head position error signal 54 from head control 50 not shown. When a write error is detected in device block 70, control unit 136 determines an error recovery procedure and enables write data formatter 108 to insert an indication of the determined error recovery procedure into device block 70. The partition of logic shown in FIG. 3 is for convenience of illustration. For example, any of head control 50, servo controller 104, write data formatter 108, read data formatter 118, and control unit 136 may be combined or may be divided into additional functional blocks.

Figure 4:
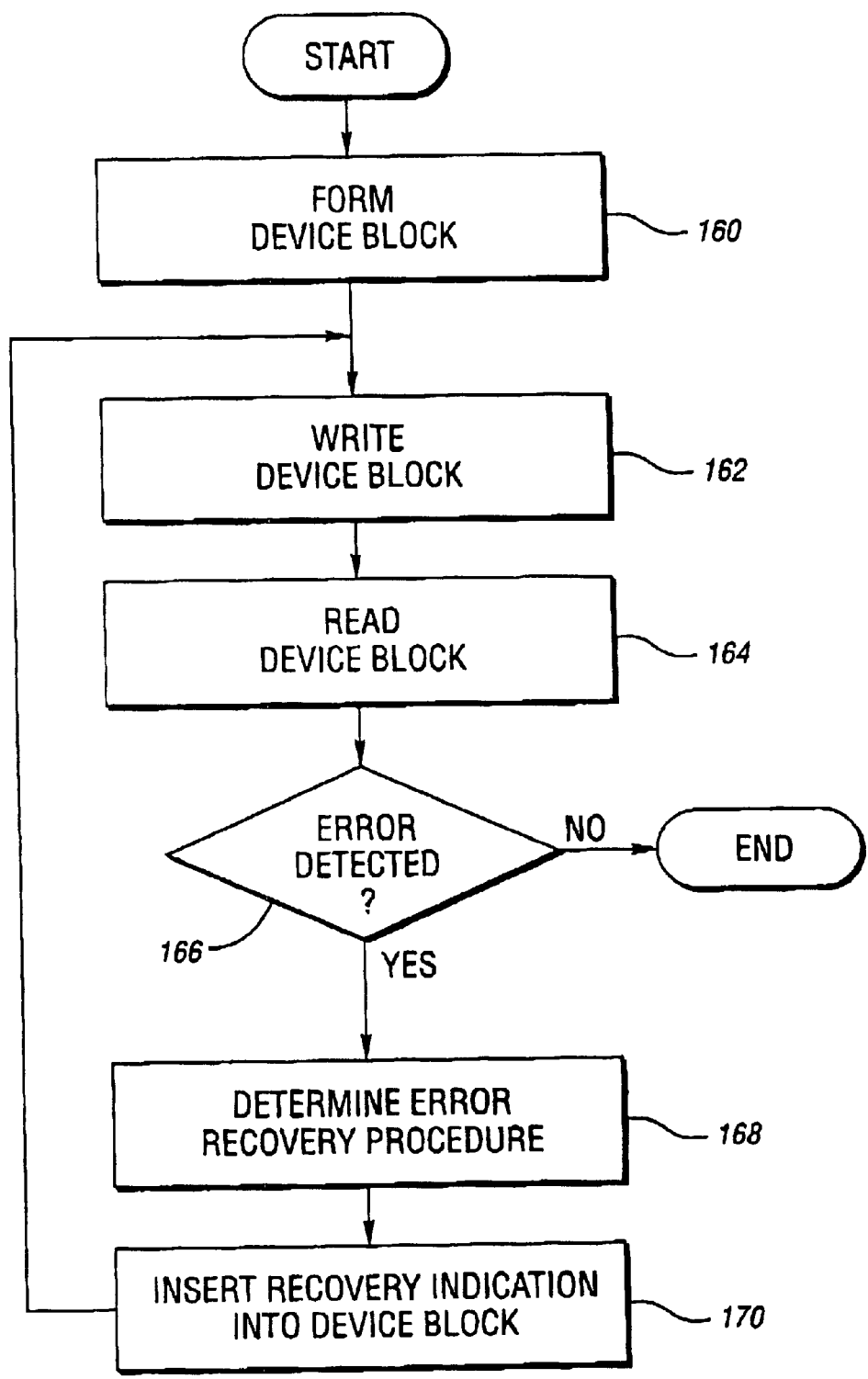
FIG. 4 is a flow diagram of a method for recording write error history according to an embodiment of the present invention.

Referring now to FIG. 4, a flow diagram of a method for recording write error history according to an embodiment of the present invention is shown. As will be appreciated by one of ordinary skill in the art, the operations illustrated are not necessarily sequential operations. Similarly, operations may be performed by software, hardware, or a combination of both. The present invention transcends any particular implementation and aspects are shown in sequential flow chart form for ease of illustration.

Device block 70 is formed in 160. As described with regards to FIG. 2 above, device block 70 may include header 74, data 76, and trailer 78. Header 74 is formed with an initial value in retry count 82. Device block 70 is written onto data track 28 in 162. If no write error is detected, the initial value in retry count 82 will indicate that only one attempt was required to write device block 70. Device block 70 is then read in 164. Typically, access head 22 permits read-after-write to immediately check information written onto data track 28. A check is made to detect a write error in 166. A write error may be detected based on input from sensors detecting, for example, media velocity and position or may be detected based on an analysis of information extracted from read signals 126. If no error is detected, device block 70 has been successfully written, and the method ends. If any additional data blocks 70 remain to be written, the method may be repeated.

If a write error is detected, an error recovery procedure is determined in 168. Determining an error recovery procedure may entail selecting the next procedure in a sequential listing of error recovery procedures. An example of such a sequence is to retry writing twice, then rewind and reposition before rewriting three times, then perform a cleaning operation on access head 22 before rewriting three times, then erase any existing data and move to a new location on data track 28 before rewriting five times, then clean access head 22 before skipping to a new location on data track 28 before rewriting five times, then mark the media as bad. For such systems, retry count 82 gives an indication of which rewrite method, if any, was successful in writing device block 70. More sophisticated schemes for determining the error recovery procedure are also possible. The error recovery procedure may be based on a combination of retry count 82, write error cause 84, and error symptom code 86. For example, if the write error cause is tape position in an append operation, determining the error recovery procedure may result in jumping directly to rewinding and repositioning the media before rewriting device block 70. Once an error recovery procedure has been determined, an indication is inserted into device block 70 in 170. An attempt to rewrite device block 70 using the determined error recovery procedure is made in block 162.

A benefit of recording information about the write history of each device block 70 is the ability to analyze the media containing device blocks 70 at a later time to extract the history. One application for the recovered history is to optimize how an error recovery procedure is determined by tape system 100 once a write error is detected. By examining the history, an indication of the types and frequencies of recording problems, as well as the types and frequencies of successful error recovery procedures, may be obtained. This information may then be implemented into the error recovery procedure determination.

While embodiments of the invention have been illustrated and described, it is not intended that these embodiments illustrate and describe all possible forms of the invention. Rather, the words used in the specification are words of description rather than limitation, and that various changes may be made without departing from the spirit and scope of the invention. For example, while a read-write-read head has been described, a read-write head, a write head followed by a read head, or a head with dual purpose read/write elements may be used. Also, the invention applies to other types of media in addition to magnetic tape, such as magnetic disks, optical media, and the like.

What is claimed is:

1. Rewritable media comprising:
   at least one data track, each data track comprising a plurality of device blocks;
   an indication of the number of attempts required to write each device block; and
   an indication of an error type detected when unsuccessfully writing at least one of the device blocks.

2. The rewriteable media of claim 1, wherein the error type is at least one of head alignment, tape velocity and media defect.

3. The rewriteable media of claim 1, wherein the error type is at least one of servo track misalignment, CRC check failure, ECC check failure, instantaneous media velocity error, average media velocity error and media improperly positioned.

4. The rewriteable media of claim 1, further comprising:
   an indication of an error recovery procedure used to successfully write the device block after an unsuccessful attempt at writing the device block.

5. Rewritable media comprising:
   at least one data track, each data track comprising a plurality of device blocks;
   an indication of the number of attempts required to write each device block; and
   an indication of an error recovery procedure used to successfully write a device block after an unsuccessful attempt at writing the device block.

6. The rewriteable media of claim 5, wherein the error recovery procedure is at least one of rewind and reposition the media, head cleaning and moving to a new media position before rewriting.

* * * * *